Jan. 5, 1954

W. A. RAY 2,665,072

VALVE FOR CONTROLLING THE ADMISSION
OF REFRIGERANT TO EVAPORATORS

Filed Feb. 28, 1949

WILLIAM A. RAY
INVENTOR.

BY John Flam
ATTORNEY

WILLIAM A. RAY
INVENTOR.

BY John Flam
ATTORNEY

Jan. 5, 1954

W. A. RAY 2,665,072

VALVE FOR CONTROLLING THE ADMISSION
OF REFRIGERANT TO EVAPORATORS

Filed Feb. 28, 1949

WILLIAM A. RAY
INVENTOR.

BY

John Flam
ATTORNEY

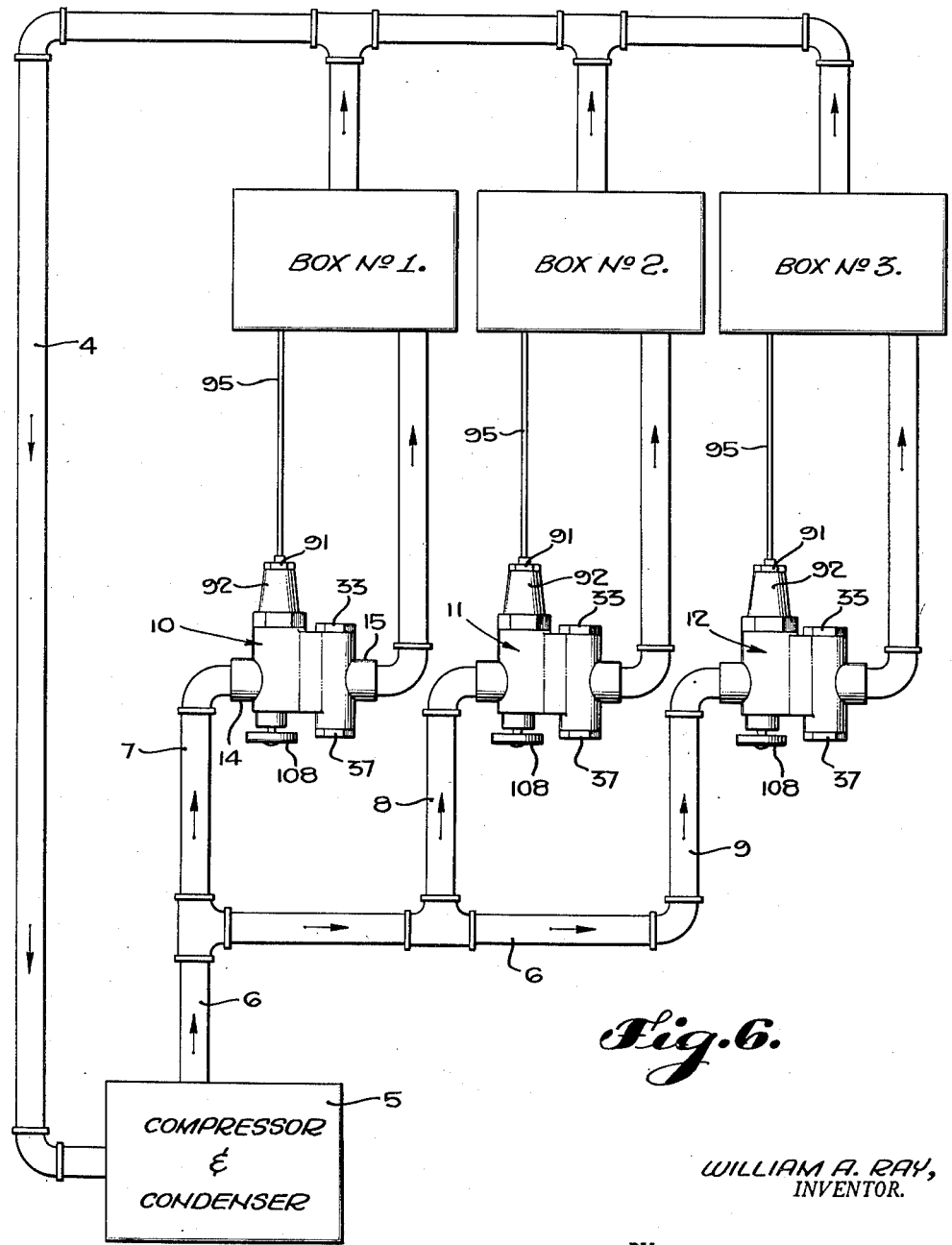

Patented Jan. 5, 1954

2,665,072

UNITED STATES PATENT OFFICE 2,665,072

VALVE FOR CONTROLLING THE ADMISSION OF REFRIGERANT TO EVAPORATORS

William A. Ray, North Hollywood, Calif., assignor to General Controls Co., a corporation of California Application February 28, 1949, Serial No. 78,876

4 Claims. (Cl. 236—80)

This invention relates to refrigeration, and particularly to a system for controlling the admission of refrigerant to an expansion space.

Many refrigerating systems utilize a highly volatile refrigerant, such as Freon, that absorbs heat when it vaporizes in an evaporator. After expansion, the vaporized refrigerant is passed out of the vaporizer, and is compressed and condensed. Liquid refrigerant may then be supplied from the condenser to the evaporator.

Passage of the refrigerant to the evaporator may be controlled by a valve that responds to the temperature of the space cooled by the refrigerating system. It is common for this purpose to use an electromagnetically operated valve that is energized by aid of a thermostat.

It is one of the objects of this invention to obviate electrical installations for controlling the flow of refrigerant, and to simplify the control system.

In many instances, multiple box installations are utilized, in such places as public markets. It is advantageous to supply all the vaporizers from a common source, such as a compressor and condenser unit. It is, accordingly, another object of this invention to simplify such multiple unit systems, and to make it readily possible for each individual box to maintain its own desired low temperature within narrow limits, and particularly without the aid of expensive electrical equipment.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Fig. 6 is a diagram of a refrigerating system utilizing multiple boxes and incorporating the invention.

Figure 1:
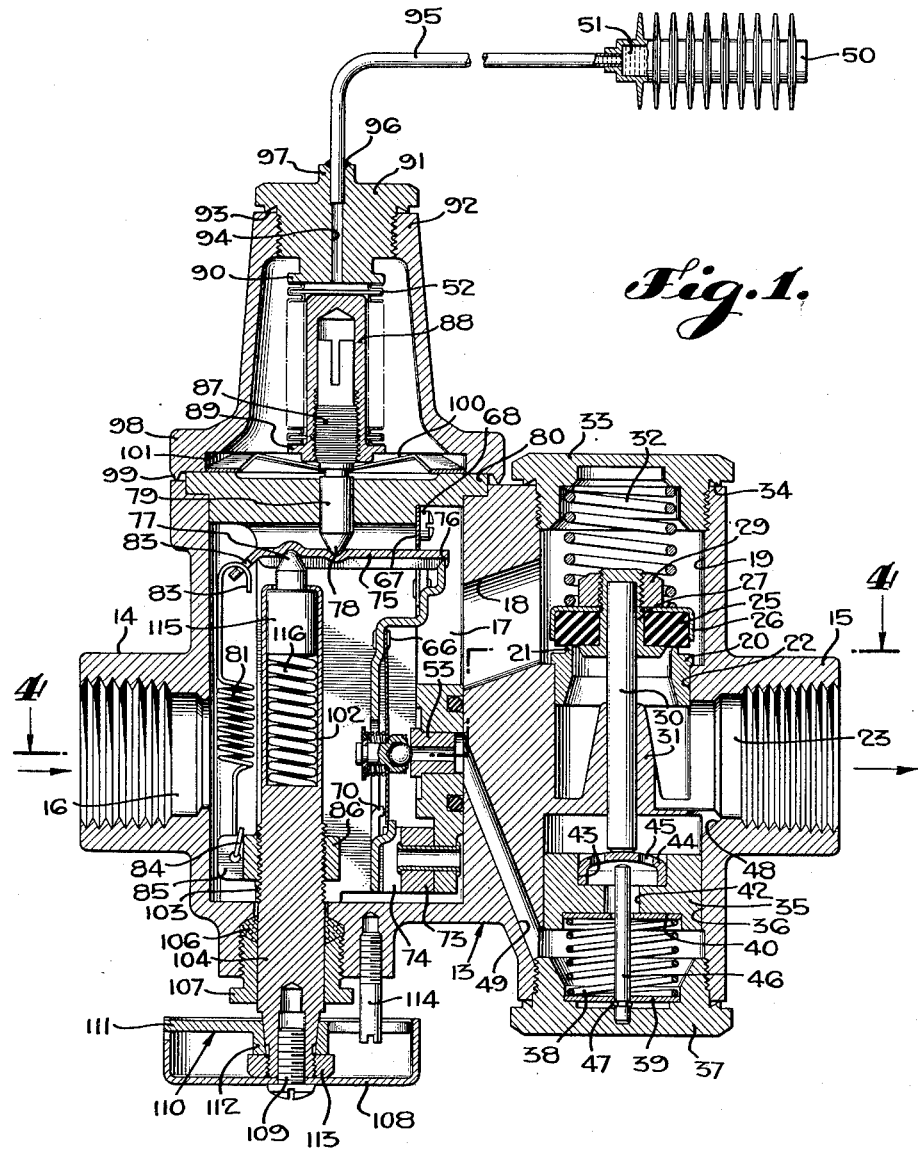
Figure 1 is a vertical sectional view of a valve structure incorporating the invention, the valve being in closed position, and the flow of refrigerant being interrupted.

In Fig. 6 a plurality of independently controlled refrigerating spaces are provided, as by the aid of box 1, box 2, and box 3.

Each of these boxes includes an evaporator or expansion coil which is supplied with liquid refrigerant, such as Freon. The liquid refrigerant expands or vaporizes in the evaporator, and is returned, as by a common return conduit 4, to the compressor and condenser system 5. Here, the refrigerant is compressed and liquified. Then the liquified refrigerant is fed, by the aid of a common conduit 6, to a plurality of branches 7, 8, and 9. Interposed in each of the branches is a controlling valve 10, 11, or 12. Each of the valves controls the flow of refrigerant to the associated evaporator.

Each of the valves 10, 11, and 12 may be in the form illustrated in Figs. 1 to 5, inclusive. It embodies some of the structure illustrated in the prior application filed in the name of William A. Ray on January 3, 1949, under Serial No. 68,896, and entitled, "Automatic Valve Operating in Response to Temperature Changes."

This application is a continuation in part of the said prior filed application.

A valve body 13, appropriately formed of a casting, serves as a main support for substantially all of the operating parts of the valve. It is provided with an inlet boss 14 and an outlet boss 15. The inlet opening 16 leads into a chamber 17 that, in turn, communicates as by the aid of a port 18 with a space 19. Space 19 serves to accommodate the main valve parts. Thus, a sleeve member 20 forms an annular valve seat 21. This member 20 is fitted into a bore 22 in body 13, and communicates with the space 19. The bore 22, in turn, is in communication with the outlet opening 23. A wall 24 closes the bottom of the bore 22. In this way, refrigerant can flow through port 18, thence through member 20, into bore 22, and out through the outlet 23.

The valve closure structure includes a valve closure proper 25 that may be made of yielding material, such as rubber, or the like. This closure 25 is held within a cup 26. In order to hold the closure 25 securely in place with relation to the cup, use is made of a hollow screw 27 passing through the closure 25 and cup 26. This screw is provided with a flange 28 that engages the lower surface of the closure 25. In the closed position shown in Fig. 1, this flange 28 fits into the member 20 and is of such diameter as not to interfere with the seating of the closure 25 on seat 21.

A nut 29 engages the upper threaded portion of the screw 27 and serves to hold the parts of the closure member together.

In order to provide a guide for the closure structure, as well as to form a means for opening it, use is made of a stem 30. The upper end of this stem fits into the hollow screw 27. It is guided by the aid of a boss 31 formed integrally with the body 13.

The valve closure structure is urged to the closed position of Fig. 1 by the aid of a compression spring 32. The lower end of this compression spring contacts the upper surface of the cup 26. Its upper end abuts the interior surface of a cap or cover 33. This cap or cover 33 is threaded into the upper portion of the body 13, and it is provided with a sealing flange 34. This sealing flange 34 cooperates with the upper surface of the body to provide a fluid-tight structure.

Figure 2:
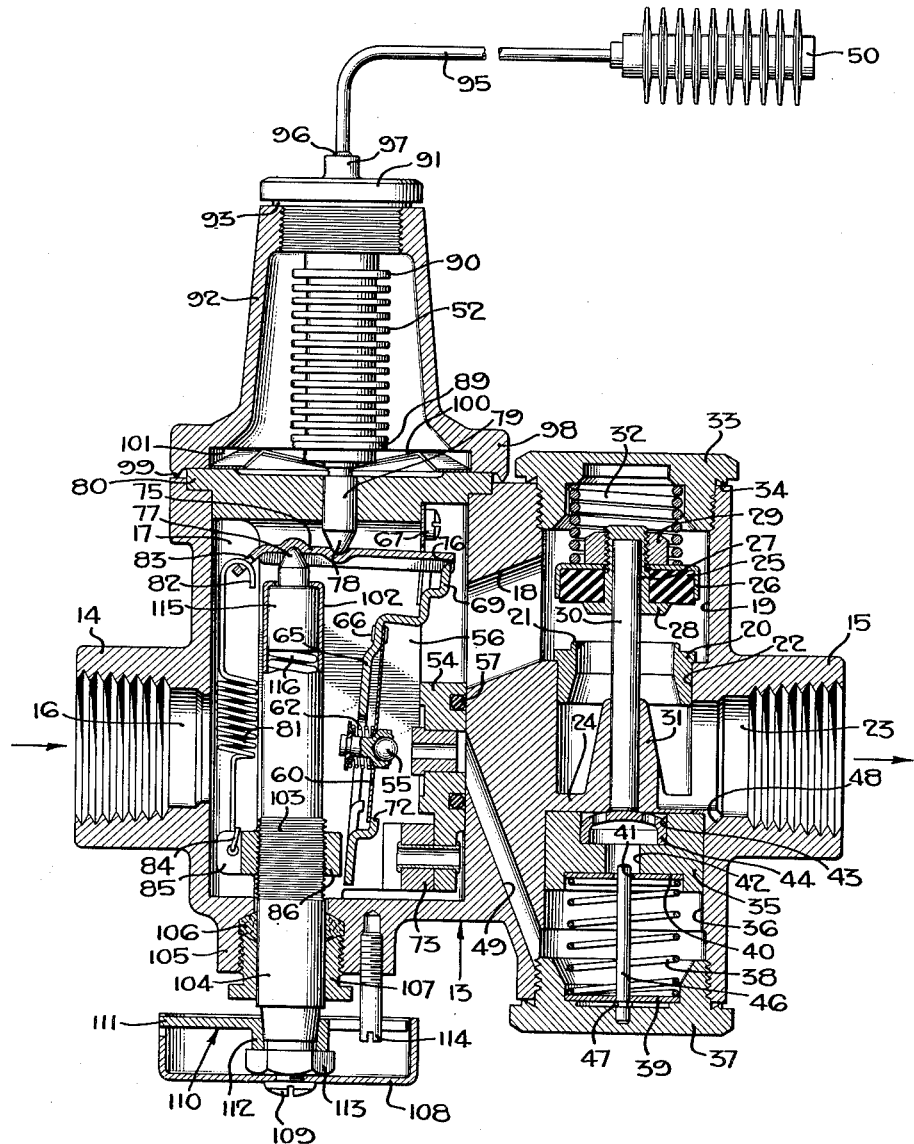
Fig. 2 is a view similar to Fig. 1, but showing the valve in open position for supplying refrigerant to a refrigerating system.
Figure 4:
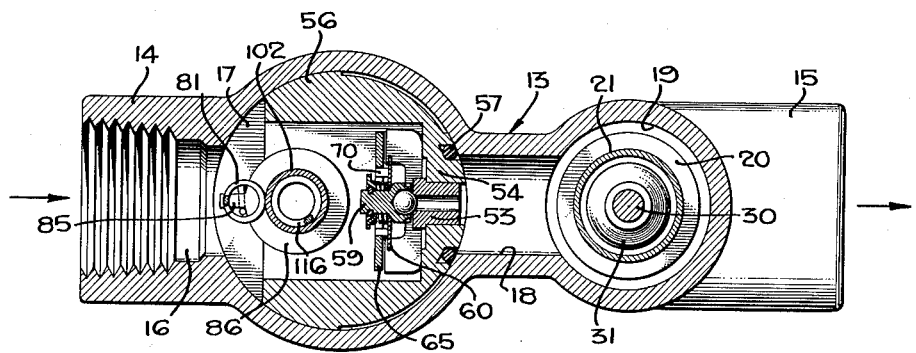
Fig. 4 is a sectional view, taken along a plane corresponding to line 4—4 of Fig. 1.
Figure 5:
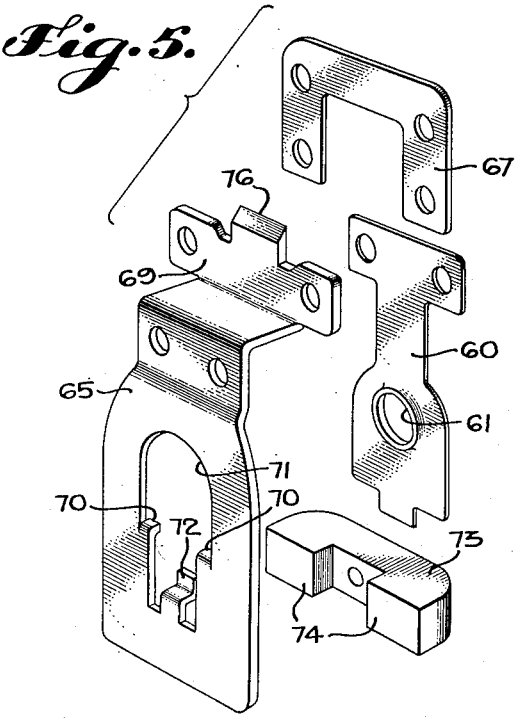
Fig. 5 is an exploded pictorial view of some of the elements of the valve mechanism.

In order to open the valve to the position of Fig. 2, the stem 30 is raised against the pressure of spring 32. This is effected by the aid of a piston 35 that operates in a cylinder bore 36. This cylinder bore 34 is aligned with the bore 22 and extends downwardly in the body 13. A cap or cover 37, similar to cover 33, seals the end of the bore 34.

The piston 35 serves as a movable wall that may be used to move the stem 30 to valve opening position. A light compression spring 38 provides a light force urging the piston 35 upwardly. Normally, when no additional force is exerted upon the piston 35, the upper compression spring 32 overpowers the spring 38 and the parts are in the closed positon of Fig. 1. The lower end of spring 38 rests against a disc 39 which is disposed on a shoulder within the cover 37. The upper end of the spring rests against another disc 40 that defines a port opening disposed in the lower portion of the piston 35. This disc 40 is disposed in a recess 41 in the lower portion of the piston 34. A through aperture 42 communicates from one side of the piston to the other by way of the recess 43 in the upper side of the piston. Within the recess 43 is an inverted cup member 44, the upper convex surface of which is in contact with the lower end of stem 30. A number of apertures 45 extend through the inverted cup 44.

When fluid under pressure is admitted into the cylinder 36, beneath the piston 35, it encounters a greatly restricted passage from the cylinder to the outlet 23. Accordingly, it exerts a lifting pressure upon the piston 35 and the piston is moved to the opening position of Fig. 2.

The restricted passage throttling the flow of refrigerant, and causing pressure to be built up beneath the piston 35, is formed by the aperture 4 and a central pin 46. This pin 46 projects through the aperture 41 and defines a narrow annular port. Pin 46 is fastened to the inner side of the cover 37. A spring ring 47 is disposed in a groove immediately above the inner surface of the cap 37. This spring ring contacts the lower surface of the disc 39 which thus helps to maintain the pin 46 in place.

The fluid being throttled through the annular port formed between the pin 46 and the aperture 41 proceeds through the port 42 and opening 45 to the slanting opening 48 formed in the upper corner of the cylinder 36. This port or aperture 48 leads directly into the outlet 23.

As the piston 35 rises under the influence of the throttled refrigerant, the aperture 48 is covered by the piston 35. Thereafter, substantially undiminished pressure of the refrigerant is useful to maintain the valve in the open position of Fig. 2; however, the piston 35 is purposely left without packing to permit a slight leakage past the piston even in the open position of Fig. 2.

Control of the passage of refrigerant to the cylinder 36 is effected through a port 49 which slants upwardly between the cylinder 36 and the space 17. Control of the flow of refrigerant through this port is effected in response to the temperature in the specific refrigerator box that is controlled by the specific valve.

Thus, for example, a feeler bulb 50, responding to the temperature within a refrigerated space, may be utilized for the control function. This feeler bulb is filled with a volatile liquid 51 which expands upon application of heat and exerts a pressure to dilate a Sylphon structure 52 upon the attainment of a definite temperature in the space to be refrigerated. This expansion causes a pilot valve to operate, for opening the passage for the refrigerant through port 49.

Figure 3:
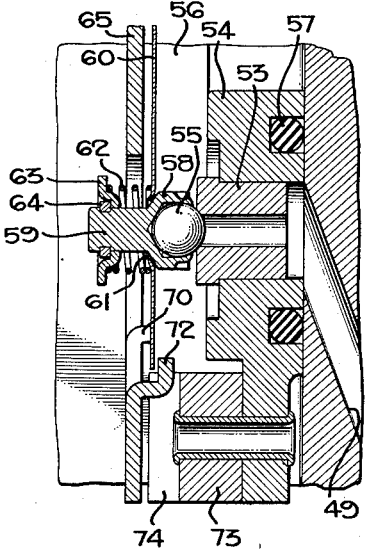
Fig. 3 is an enlarged fragmentary vertical sectional view of the auxiliary or control valve structure utilized in connection with the invention.

In order to control port 49, use is made of a pilot valve structure shown in enlarged form in Fig. 3. Thus, there is a tubular valve seat 53 firmly held in a boss 54 and serving to cooperate with a spherical or ball valve closure 55. The boss 54 is formed integrally with a cage structure 56 (see, also, Fig. 4) that is telescoped within the body 13 and is held in sealing relation thereto in a manner to be hereinafter described. It is sufficient for the moment to note that an O sealing ring 57 is accommodated in a groove formed in the outer surface of the boss 54, and maintains a seal between the cage 56 and the corresponding interior wall of the casing or body 13.

The ball 55 forming a closure for the valve seat 53 is accommodated in a socket 58 that is formed at the end of a stem 59. The edge of the socket is turned slightly inward to retain the ball therein. Stem 59 passes through aperture 61 in a leaf spring support 60 (see, also, Fig. 5). The aperture 61 has its edges formed as a socket in order to permit universal movement of the stem 59 with respect to its supporting spring 60. The stem 59 is resiliently held against the edge of the aperture 61 by the aid of a compression spring 62 extending between the left-hand side of the spring 60 and flanged ring 63. This flanged ring 63 is restrained against axial movement outwardly of the stem 59 by the aid of the spring ring 64 disposed in a groove around the left-hand end of the stem 59.

Leaf spring 60 is attached, as by the aid of hollow rivets 66, to a lever arm 65. This lever arm is hinged by the aid of U-shaped spring hinge 67. The horizontal upper portion of this spring hinge 67 is fastened, as by screws 68, to a boss provided on the cage 56. The arms are, in turn, attached as by hollow rivets to the ends of the transverse arm 69 (Fig. 5) formed on the lever 65.

Normally, the spring hinge 67 urges the lever 65 to the closed position illustrated in Fig. 1. In this closed position, the leaf spring 60 is urged by the lever 65 toward the right by the pair of projections 70 formed integrally with the lever 65. These projections extend inwardly from the edge of the central opening 71 of this lever.

When the lever 65 is moved to the opening position of Fig. 2, the spring 60 is, by its natural resilience, urged against another stop 72 formed at the bottom edge of the opening 71.

The ball 55 may seat accurately upon the seat 53 in view of the universal movement permitted between the stem 59 and its supporting spring 60.

Provisions may be made for causing the lever 65 to move to the open position of Fig. 2 by a snap action. For this purpose a permanent magnet 73 is riveted to a wall of the cage 56. Its pole faces 74 cooperate with the lower portion of the lever 65 which is made of magnetic material. In the seated position of Figs. 1 and 3, there is a small gap between the lower end of lever 65 and the pole faces 74.

When a sufficient force is exerted to move the lever 65 in a clockwise direction, the force of the magnet 73 is suddenly overcome and the lever 65 snaps to the open position of Fig. 2.

Operation of the lever 65 is accomplished by the aid of supplemental lever 75. This supplemental lever 75 is of U-shaped cross section and has a right-hand extremity which rests against a knife edge 76 formed at the upper end of the cross arm 69 of lever 65. The supplemental lever 75 is pivotally mounted upon a round conical fulcrum point 77. For the present this fulcrum point 77 may be assumed to be stationary. It is accommodated in a spherical depression in the lower side of the lever 75.

At an intermediate portion of the lever 75 there is another spherical depression for the accommodation of the conical end 78 of an actuating pin 79. This actuating pin 79 is slidably mounted in the upper wall of the cage 56. This upper wall has a flange 80 that is accommodated in a shoulder in the upper side of the body 13.

The lever 75 is urged in a counterclockwise direction and against the lower conical point 78 by the aid of a tension spring 81. This tension spring 81 has an upper hook 82 engaging in an aperture 83 at the left-hand end of the lever 75. The lower end of the spring 81 is similarly formed with a hook 84 that engages within an ear 85. This ear 85 extends from a boss 86 formed integrally with the cage 56.

The actuating pin 79 is formed with a threaded upper end 87 that is accommodated in a hollow member 88. A lower flange 89 on this member 88 is sealed to the lower end of the corrugated bellows or Sylphon 52. The upper end of the Sylphon is sealed to the inner flange 90 of a cap 91. This cap 91 threads into the upper end of a cover member 92. The cap 91 has a tapered sealing flange 93 rendering the structure fluid-tight at the top of the cover 92.

The cap 91 has a through port 94 in communication with the interior of the bellows 52. The port 94 is also in communication with the feeler bulb 50, as by a conduit 95. This conduit 95 may be sealed, as by an appropriate solder 96, into the boss 97 extending upwardly from the cap 91.

As the liquid 51 in the feeler bulb 50 expands, pressure is exerted by the bellows 52 to urge the pin 79 downwardly and the lever 75 in a clockwise direction. This lever 75, in turn, causes ultimate opening of the pilot valve by operation of lever 65, lifting the ball 55 from the seat 53. This controlling action occurs whenever the feeler bulb 50 is subjected to a sufficiently high temperature.

The cover 92 has a flange 98 that is provided with a knife-edge tapered flange 99. This tapered flange cooperates with the upper surface of the valve body 13 to provide a seal for the interior of the valve body. It may be held in place by any appropriate means, such as cap screws, or the like.

The upper flange 80 of the cage 56 is not tightened by the flange 98; instead, a spring washer structure 100 is utilized for this purpose. This spring washer structure is in the form of an annulus. At different angular positions along the annulus there are high points alternating with low points, forming a zig-zag configuration. The high points are contacted by the inner surface 101 of the cover 92; the low points are in contact with the upper surface of flange 80. In this way the cage 56 is urged downwardly into proper position in the body 13.

The fulcrum 77 about which the auxiliary lever 75 is movable is supported by a stem member 102 in a manner to be hereinafter described. An intermediate portion of this member 102 is threaded, as indicated at 103, and engages corresponding threads in the boss 86. By turning the hollow stem 102, the position of the fulcrum point 77 can be adjusted. This corresponds to an adjustment of the temperature at which the lever 75 may be actuated to permit this main valve structure to open.

In order to make it possible to adjust this fulcrum point exteriorly of the casing 13, the lower end 104 of the stem 102 extends through the flange 105 of the body 13.

A packing 106 surrounds this lower end 104, and is held in place by the hollow gland nut 107. A handle 108 is attached to the lower end of the stem 102, as by the screw 109. Furthermore, the handle 108 is keyed to the stem 102 by the aid of a disc-like member 110 having a radial projection 111 engaging in a slot in the upper edge of the handle 108. The hub 112 of the member 110 is tapered to fit a corresponding taper at the end of the stem 102. A nut 113 threaded on the end of the stem 102 urges the tapered surfaces together.

The extent of adjustment is limited by the aid of a stop screw 114 threaded into the boss 13. The disc-like member 110 has a wide angular slot therein, the sides of which operate as stops against the pin 114; and, in this way, the angular movement of the handle 108 is limited.

In order to ensure against the transmission of disturbingly large forces by the actuating pin 79, provisions are made to cause depression of the fulcrum point 77, rather than the operation of lever 75 when such forces are encountered. For this reason the fulcrum point 77 is formed integrally with an enlarged cylindrical portion 115 that is slidable within the hollow recess in the upper end of stem 102. The wall of the recess is turned inwardly to restrict outward movement of the fulcrum beyond the stem 102. It is urged to its outermost position with respect to the stem 102 by a strong compression spring 116 mounted in the stand 102. During normal operation this spring 116 has such rigidity as to maintain the fulcrum point 77 in a stationary position. If an undue force is exerted by the actuating pin 79, however, the fulcrum point 77 can be depressed against the force of the spring 116.

The mode of operation of the valves 10, 11, and 12 in the system shown in Fig. 6 is clear from the foregoing. Upon occurrence of an undesired high temperature in either one of the boxes 1, 2, or 3, the corresponding feeler bulb 50 is subjected to this temperature and causes an expansion of the bellows 52. The bellows 52, in turn, operates the auxiliary lever 75 to move the pilot valve closure 55 to the open position of Fig. 2. This is accomplished by a snap action. Fluid pressure can then be exerted via inlet 16, chamber 17, seat 53, bore 49, to the cylinder 36. Although the refrigerant can pass through the restricted annular port formed around the pin 46, it nevertheless exerts a sufficient pressure on the piston 35 to move the valve closure 25 to the open position of Fig. 2. Then a supply of refrigerant can pass through the port 18 and member 20 to the outlet 23, and thence to the corresponding evaporator in the box.

Upon a sufficient reduction of temperature, the liquid 51 of the feeler bulb 50 is condensed sufficiently to permit the pilot valve closure 55 to move to the closed position of Fig. 1. There is a gradual reduction of pressure in the cylinder 36 and the valve is caused to close.

The inventor claims:

1. In a valve structure: a valve body having an inlet passage and an outlet passage; means forming a valve seat between the passages; a valve closure cooperating with the seat; a stem extending through the seat and connected to the closure for forcing the closure away from the seat; and means for moving the stem, comprising a piston; said piston having a restricted port between opposite sides thereof; and means for admitting fluid to one of said sides of the piston to urge the piston to valve opening position; said body having means forming a port between the other side of the piston and said outlet passage, said piston when in valve opening position serving to close said port.

2. In a valve structure: a valve body having an inlet passage and an outlet passage; means forming a valve seat between the passages; a valve closure engageable with the seat for controlling flow of fluid between the passages; a valve stem extending through the seat and connected to the closure for lifting the closure from the seat; means forming a pressure chamber in said valve body; a movable piston in said chamber, said piston having a longitudinally extending through recess; a pin carried by the body and extending in said longitudinally extending recess of said piston, said pin cooperating with said recess to define a bleeder port permitting throttled flow of fluid therethrough; said body having a port communicating with said inlet passage and one side of said piston respectively; condition responsive means for controlling the port; said body having means forming another port between said outlet passage and the other side of said piston, said other port being closed upon movement of said piston to a limiting position upon the application of pressure to said one side of said piston; and a connection between said piston and said stem.

3. In a valve structure: a valve body having an inlet passage and an outlet passage; said body having a longitudinal recess extending transversely of said passages, and opening exteriorly of said body at opposite sides thereof; a partition extending across said body, and defining on one side thereof a valve chamber, and on the other side thereof a pressure chamber; a sleeve insertable in said recess and positioned intermediate the length of said valve chamber and between said passages, said sleeve having means forming a valve seat; a closure member in said valve chamber; a cap closing that recess opening that communicates with said valve chamber; resilient means interposed between said cap and said closure for urging said closure toward said seat; a valve stem extending through said sleeve and longitudinally through said partition, and into said pressure chamber, one end of said stem engaging said closure for lifting said closure from said seat; said partition having a recess guidingly accommodating said stem; a piston in said pressure chamber and movable longitudinally thereof, said piston engaging the other end of said stem on one side of said piston; said piston having a throttling aperture between opposite sides of said piston; another cap closing that recess opening that communicates with said pressure chamber; resilient means between said other cap and the other side of said piston for urging said piston in a direction in said pressure chamber to move the stem to valve closure opening position; means for admitting fluid under pressure to said pressure chamber in communication with said other side of said piston; and condition responsive means for controlling said admitting means; said valve body having a port between said outlet passage and said pressure chamber communicating with said one side of said piston, said port being out of alignment with said throttling aperture, and closed upon movement of said piston to a limiting position upon the application of pressure to said other side of said piston.

4. In a valve structure: a valve body having an inlet passage and an outlet passage; means forming a valve seat between the passages; a valve closure engageable with the seat; a valve stem for lifting the closure from said seat; means forming a piston chamber in said valve body; a movable piston in the chamber, said piston having a longitudinal recess; a port forming member in the recess on one side of said piston, and in engagement with said stem; a plate carried on the other side of said piston, said plate having an aperture aligned with said piston recess; a pin carried by said body and extending through said aperture into said recess, said pin forming with said apertured plate an annular throttling port; means for passing fluid under pressure to said other side of said piston; said body having means forming a passage between the said one side of said piston and said outlet passage, said passage forming means being out of alignment with said piston recess whereby said passage forming means is closed by said piston when said piston reaches a limiting position in response to the admission of fluid under pressure to said chamber.

WILLIAM A. RAY.

References Cited in the file of this patent

UNITED STATES PATENTS

| Number | Name | Date |
|---|---|---|
| 1,019,496 | Larson | Mar. 5, 1912 |
| 1,524,452 | Partlow | Jan. 27, 1925 |
| 1,603,358 | Rosenburgh | Oct. 19, 1926 |
| 1,625,000 | Ulmann | Apr. 19, 1927 |
| 2,029,203 | Soderberg | Jan. 28, 1936 |
| 2,039,358 | Spencer | May 5, 1936 |
| 2,056,401 | Hoesel | Oct. 6, 1936 |
| 2,367,305 | Newton | Jan. 16, 1945 |
| 2,401,144 | Dube | May 28, 1946 |
| 2,490,420 | Davis | Dec. 6, 1949 |
| 2,504,689 | Hopp | Apr. 18, 1950 |